(12) United States Patent
Nakao et al.

(10) Patent No.: US 7,333,566 B2
(45) Date of Patent: Feb. 19, 2008

(54) RADIO RECEPTION APPARATUS, RADIO RECEPTION METHOD AND RADIO RECEPTION PROGRAM CAPABLE OF SWITCHING MODULATION METHODS

(75) Inventors: Seigo Nakao, Gifu (JP); Katsutoshi Kawai, Bisai (JP)

(73) Assignees: Sanyo Electric Co., Ltd, Osaka (JP); Sanyo Telecommunications Co., Ltd, Osaka (JP)

( * ) Notice: Subject to any disclaimer, the term of this patent is extended or adjusted under 35 U.S.C. 154(b) by 653 days.

(21) Appl. No.: 10/618,617

(22) Filed: Jul. 15, 2003

(65) Prior Publication Data

US 2004/0014443 A1   Jan. 22, 2004

(30) Foreign Application Priority Data

Jul. 19, 2002   (JP) .............................. 2002-211267

(51) Int. Cl.
*H03K 9/00* (2006.01)

(52) U.S. Cl. ..................................... 375/316

(58) Field of Classification Search ............... 375/225, 375/285, 316, 322, 324, 298, 302, 261, 264, 375/328, 222; 455/102, 133–135, 63.1; 370/543
See application file for complete search history.

(56) References Cited

U.S. PATENT DOCUMENTS

| | | | | |
|---|---|---|---|---|
| 5,550,881 A * | 8/1996 | Sridhar et al. | ............... | 375/377 |
| 5,557,644 A * | 9/1996 | Kuwabara | ................... | 375/340 |
| 6,167,031 A | 12/2000 | Olofsson et al. | | |
| 6,236,676 B1 * | 5/2001 | Shaffer et al. | .............. | 375/222 |
| 6,262,994 B1 | 7/2001 | Dirschedl et al. | | |
| 6,452,964 B1 * | 9/2002 | Yoshida | ....................... | 375/222 |
| 6,567,475 B1 * | 5/2003 | Dent et al. | ................. | 375/286 |
| 6,587,473 B2 | 7/2003 | Terry et al. | | |
| 6,611,795 B2 * | 8/2003 | Cooper | ........................ | 702/191 |
| 6,639,952 B1 * | 10/2003 | Meyer | ........................ | 375/327 |
| 6,748,021 B1 * | 6/2004 | Daly | ............................ | 375/261 |
| 6,965,639 B2 * | 11/2005 | Uesugi | ......................... | 375/225 |
| 2001/0017896 A1 * | 8/2001 | Murakami et al. | .......... | 375/260 |

(Continued)

FOREIGN PATENT DOCUMENTS

EP    0998069 A2    5/2000

(Continued)

OTHER PUBLICATIONS

Music, Wayne of Broadcom Corp., "Statistical Analysis of Noise Measure Accuracy", IEEE p. 802.15-01/090r2, Wireless Personal Area Networks, (Mar. 8, 2001).

(Continued)

*Primary Examiner*—Khanh C. Tran
(74) *Attorney, Agent, or Firm*—McDermott Will & Emery LLP

(57) ABSTRACT

In a radio reception apparatus compatible with adaptive modulation, based on a received IQ signal processed by a reception processing unit, a determining unit calculates EVM that corresponds to a magnitude of shift-off between a true symbol point and the received symbol point. The calculated EVM is averaged and thereafter applied to a control unit. The control unit compares the applied EVM with a prescribed threshold value, and determines with high accuracy, switching among a plurality of modulation methods having different multi-value numbers.

27 Claims, 10 Drawing Sheets

U.S. PATENT DOCUMENTS

| | | |
|---|---|---|
| 2001/0055319 A1 | 12/2001 | Quigley et al. |
| 2002/0142732 A1 | 10/2002 | Asano |
| 2003/0125066 A1 | 7/2003 | Habetha |
| 2004/0218568 A1 | 11/2004 | Goodall et al. |

FOREIGN PATENT DOCUMENTS

| | | |
|---|---|---|
| JP | 57-159148 | 10/1982 |
| JP | 4-243343 A | 8/1992 |
| JP | 6-507763 A | 9/1994 |
| JP | 9-219697 A | 8/1997 |
| JP | 10-41876 | 2/1998 |
| JP | 10-93650 A | 4/1998 |
| JP | 11-032028 | 2/1999 |
| JP | 2000-106539 A | 4/2000 |
| JP | 2002-199033 | 7/2002 |
| WO | WO 92/22162 | 12/1992 |

OTHER PUBLICATIONS

Kikuma, Nobuyoshi, "Chapter 3: MMSE Adaptive Array" In "Adaptive Signal Processing by Array Antenna", Kagaku Gijutsu Shuppan, pp. 35-49, (Nov. 25, 1998).

Japanese Office Action with English translation issued in corresponding Japanese Patent Application No. JP 2002-211267, mailed Feb. 20, 2007.

* cited by examiner

F I G. 1
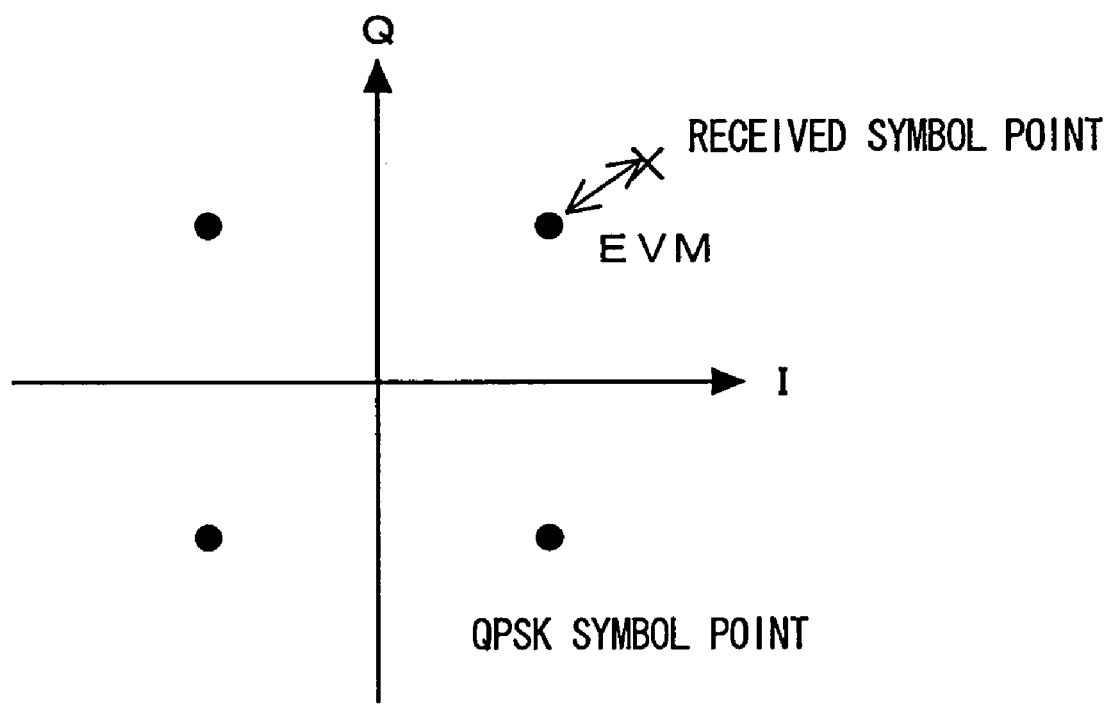

RADIO RECEPTION APPARATUS, RADIO RECEPTION METHOD AND RADIO RECEPTION PROGRAM CAPABLE OF SWITCHING MODULATION METHODS

BACKGROUND OF THE INVENTION

1. Field of the Invention

The present invention relates to a radio reception apparatus, a radio reception method and a radio reception program. More specifically, the present invention relates to a radio reception apparatus, a radio reception method and a radio reception program that are capable of switching a plurality of modulation methods having different multi-value numbers in accordance with quality of communication.

2. Description of the Background Art

Conventionally, in a mobile communication system such as PHS (Personal Handyphone System), communication between a mobile terminal (hereinafter referred to as a terminal) and a radio base station (hereinafter referred to as a base station) is established by using a prescribed modulation method, for example, using well-known QPSK (Quadrature Phase Shift Keying) modulation method.

FIG. 10A shows an arrangement of symbol points in accordance with the QPSK modulation method on an IQ coordinate plane. Referring to FIG. 10A, according to the QPSK method, a symbol point of a received signal corresponds to any of the four signal points positioned concentrically on the IQ coordinate plane. Therefore, it is possible to transmit at one time 2 bits of data representing any of the four signal points. Conventionally, communication between the terminal and the base station is performed using a fixed modulation method, for example, the QPSK modulation method described above.

Recent mobile communication systems, however, require data transmission of larger volume at higher speed such as data communication, as compared with conventional voice communication. Accordingly, multi-value modulation methods having number of multi-value larger than the QPSK method mentioned above have been developed. As an example of such multi-value modulation method, 16QAM (Quadrature Amplitude Modulation) method has been known and practically utilized in some systems of data communications.

FIG. 10B shows an arrangement of symbol points in accordance with 16 QAM modulation method on the IQ coordinate plane. Referring to FIG. 10B, according to 16QAM modulation method, a symbol point of a received signal corresponds to any of a total of 16 signal points on the coordinate plane, arranged four by four in a lattice form in each quadrant of the IQ coordinate plane. Therefore, it is possible to transmit at a time 4 bits of data representing any of 16 signals.

When a modulation method having a larger multi-value number such as the 16 QAM method is employed as a method of modulation in a mobile communication system such as the PHS and communication environment of the propagation path is defective (if the propagation path has severe interference or noise), then symbol points may possibly be recognized erroneously, because the interval between each of the symbol points is narrow and symbol points are arranged tightly in 16 QAM, as can be seen from the arrangement of symbol points of FIG. 10B. Therefore, though this method has communication speed faster than the QPSK modulation method shown in FIG. 10A, it is more prone to make reception errors.

In view of the foregoing, a concept of adaptive modulation has been proposed, in which communication is performed while adaptively switching between a modulation method having a smaller multi-value number such as the QPSK (which is slower in communication speed but less susceptible to the influence of propagation path) and a modulation method having a larger multi-value number such as 16 QAM (which is faster in communication speed but more susceptible to the influence of propagation path) in consideration of the state of the propagation path, that is, the quality of communication (reception), in order to improve speed of communication as much as possible.

Specifically, an approach has been proposed in which the quality of communication (reception) of the propagation path is evaluated using some parameter, and the multi-value number is increased from QPSK to 16 QAM, for example, to improve the speed of communication only when a prescribed quality is satisfied.

Conventionally, reception level, reception error (for example, FER: Frame Error Rate) and interference level (for example, CIR: Carrier to Interference Ratio, representing a ratio of the desired wave and the interference) have been considered as parameters for evaluating the communication quality of the propagation path.

The aforementioned parameters to be the basis of switching among modulation methods proposed in the conventional method of adaptive modulation, however, are not always appropriate for evaluating the communication quality of the propagation path.

Specifically, the magnitude of reception level increases when a radio apparatus of the counter part of communication comes closer. Therefore, it is not the case that a higher reception level means a good communication environment (with small interference or noise) of the propagation path. Further, as can be seen from the comparison of the modulation methods shown in FIGS. 10A and 10B, even when there is no reception error with a modulation method (QPSK) having smaller multi-value number (smaller number of symbol points on the IQ plane), it is unpredictable whether there arises reception error or not with another modulation method (16QAM) having a larger multi-value number (having dense symbol points on the IQ plane). Meanwhile, it requires special and complicated procedure and technically very difficult to actually measure the interference level (for example, CIR) of the propagation path during communication.

Further, different radio reception apparatuses employ different methods of reception (for example, a conventional reception method with one antenna, an adaptive array reception method with plural antennas). In addition, performances and qualities of components such as filters used in the reception apparatuses vary one by one, and such differences and variations have influence on the quality of communication.

The conventional parameters mentioned above, however, do not reflect such quality or performances of the reception apparatuses. From this point also, it has been difficult to exactly evaluate the communication quality by using the conventional parameters.

Therefore, in the conventional adaptive modulation technique, it has been difficult to correctly switch among modulation methods having different multi-value numbers while exactly evaluating the communication quality of the propagation path.

SUMMARY OF THE INVENTION

Therefore, an object of the present invention is to provide a radio reception apparatus, a radio reception method and a radio reception program that are capable of surely switching among different methods of modulation, using a parameter capable of exactly evaluating communication quality of a propagation path.

According to an aspect, the present invention provides a radio reception apparatus compatible with a plurality of modulation methods having different multi-value numbers, including a measuring unit, a comparing unit and a modulation method switching unit. The measuring unit measures an error vector that corresponds to a distance between an original symbol point of a received signal and an actually received symbol point on the IQ coordinate plane. The comparing unit compares the measured error vector with a prescribed threshold value. The modulation method switching unit switches the modulation method in accordance with the result of comparison by the comparing unit.

Preferably, when a switching request is made during a communication in a first modulation method having a small multi-value number for switching to a second modulation method having a larger multi-value number and it is determined by the comparing unit that the measured error vector is not larger than a prescribed first threshold value, the modulation method switching unit switches the modulation method from the first modulation method to the second modulation method, and when it is determined that the error vector is larger than the first threshold value, maintains the first modulation method.

Preferably, the measuring unit detects other parameter for evaluating communication quality of a propagation path in addition to the error vector, and the modulation method switching unit maintains the first modulation method when it is determined that the measured error vector is larger than the first threshold value, even when the detected parameter represents a relatively satisfactory communication quality.

Preferably, when a request for interrupting communication through a propagation path because of degradation of communication quality is made during a communication in a second modulation method having a large multi-value number and it is determined by the comparing unit that the measured error vector is not larger than a prescribed second threshold value, the modulation method switching unit switches the modulation method from the second modulation method to a first modulation method having smaller multi-value number to maintain communication, and when it is determined that the error vector is larger than the second threshold value, interrupts communication through the propagation path.

Preferably, the measuring unit detects other parameter for evaluating communication quality of a propagation path in addition to the error vector, and the modulation method switching unit interrupts communication through the propagation path when it is determined that the measured error vector is larger than the second threshold value, even when the detected parameter represents a relatively satisfactory communication quality.

Preferably, the radio reception apparatus further includes a reception processing unit performing a reception process of selecting or synthesizing the received signal and the measuring unit measures the error vector of the received signal that has been subjected to the reception process.

Preferably, the radio reception apparatus further includes an intra-frame averaging unit for averaging error vectors measured by the measuring unit over a prescribed number of symbols in a frame.

Preferably, the radio reception apparatus further includes an inter-frame averaging unit for averaging error vectors measured by the measuring unit over frames.

Preferably, the modulation method switching unit notifies switching of the modulation method to a radio apparatus of a partner of communication.

According to another aspect, the present invention provides a radio reception method in a radio reception apparatus compatible with a plurality of modulation methods having different multi-value numbers, including the steps of: measuring an error vector corresponding to a distance between an original symbol point of a received signal and an actually received symbol point on an IQ coordinate plane; comparing the measured error vector with a prescribed threshold value; and switching the modulation method in accordance with result of comparison by the comparing step.

Preferably, in the step of switching the modulation method, when a switching request is made during a communication in a first modulation method having a small multi-value number for switching to a second modulation method having a larger multi-value number and it is determined by the comparing step that the measured error vector is not larger than a prescribed first threshold value, the modulation method is switched from the first modulation method to the second modulation method, and when it is determined that the error vector is larger than the first threshold value, the first modulation method is maintained.

Preferably, in the measuring step, other parameter for evaluating communication quality of a propagation path is detected in addition to the error vector, and in the modulation method switching step, the first modulation method is maintained when it is determined that the measured error vector is larger than the first threshold value, even when the detected parameter represents a relatively satisfactory communication quality.

Preferably, in the step of switching the modulation method, when a request for interrupting communication through a propagation path because of degradation of communication quality is made during a communication in a second modulation method having a large multi-value number and it is determined by the comparing step that the measured error vector is not larger than a prescribed second threshold value, the modulation method is switched from the second modulation method to a first modulation method having smaller multi-value number to maintain communication, and when it is determined that the error vector is larger than the second threshold value, communication through the propagation path is interrupted.

Preferably, in the measuring step, other parameter for evaluating communication quality of a propagation path is detected in addition to the error vector, and in the modulation method switching step, communication through the propagation path is interrupted when it is determined that the measured error vector is larger than the second threshold value, even when the detected parameter represents a relatively satisfactory communication quality.

Preferably, the radio reception method further includes the step of performing a process of selecting or synthesizing the received signal, and in the measuring step, the error vector of the received signal that has been subjected to the process of selecting or synthesizing the received signal is measured.

Preferably, the radio reception method further includes the step of averaging error vectors measured in the step of measuring over a prescribed number of symbols in a frame.

Preferably, the radio reception method further includes the step of averaging error vectors measured in the step of measuring over frames.

Preferably, in the step of switching the modulation method, switching of the modulation method is notified to a radio apparatus of a partner of communication.

According to a still further aspect, the present invention provides a radio reception program in a radio reception apparatus compatible with a plurality of modulation methods having different multi-value numbers, to have a computer execute the steps of: measuring an error vector corresponding to a distance between an original symbol point of a received signal and an actually received symbol point on an IQ coordinate plane; comparing the measured error vector with a prescribed threshold value; and switching the modulation method in accordance with result of comparison by the comparing step.

Preferably, in the step of switching the modulation method, when a switching request is made during a communication in a first modulation method having a small multi-value number for switching to a second modulation method having a larger multi-value number and it is determined by the comparing step that the measured error vector is not larger than a prescribed first threshold value, the modulation method is switched from the first modulation method to the second modulation method, and when it is determined that the error vector is larger than the first threshold value, the first modulation method is maintained.

Preferably, in the measuring step, other parameter for evaluating communication quality of a propagation path is detected in addition to the error vector, and in the modulation method switching step, the first modulation method is maintained when it is determined that the measured error vector is larger than the first threshold value, even when the detected parameter represents a relatively satisfactory communication quality.

Preferably, in the step of switching the modulation method, when a request for interrupting communication through a propagation path because of degradation of communication quality is made during a communication in a second modulation method having a large multi-value number and it is determined by the comparing step that the measured error vector is not larger than a prescribed second threshold value, the modulation method is switched from the second modulation method to a first modulation method having smaller multi-value number to maintain communication, and when it is determined that the error vector is larger than the second threshold value, communication through the propagation path is interrupted.

Preferably, in the measuring step, other parameter for evaluating communication quality of a propagation path is detected in addition to the error vector, and in the modulation method switching step, communication through the propagation path is interrupted when it is determined that the measured error vector is larger than the second threshold value, even when the detected parameter represents a relatively satisfactory communication quality.

Preferably, the radio reception program makes the computer further execute the step of performing a process of selecting or synthesizing the received signal, and in the measuring step, the error vector of the received signal that has been subjected to the process of selecting or synthesizing the received signal is measured.

Further, the radio reception program makes the computer further execute the step of averaging error vectors measured in the step of measuring over a prescribed number of symbols in a frame.

Further, the radio reception program makes the computer further execute the step of averaging error vectors measured in the step of measuring over frames.

Preferably, in the step of switching the modulation method, switching of the modulation method is notified to a radio apparatus of a partner of communication.

Therefore, according to the present invention, in a radio reception apparatus compatible with the adaptive modulation method, as a parameter for evaluating communication quality of a propagation path, an error vector that reflects all the elements related to the communication quality is used, and hence, different modulation methods can surely be switched to one another in accordance with the communication quality of the propagation path.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 represents QPSK symbol points on an IQ coordinate plane illustrating a principle of the present invention.

DESCRIPTION OF THE PREFERRED EMBODIMENTS

Figure 2:
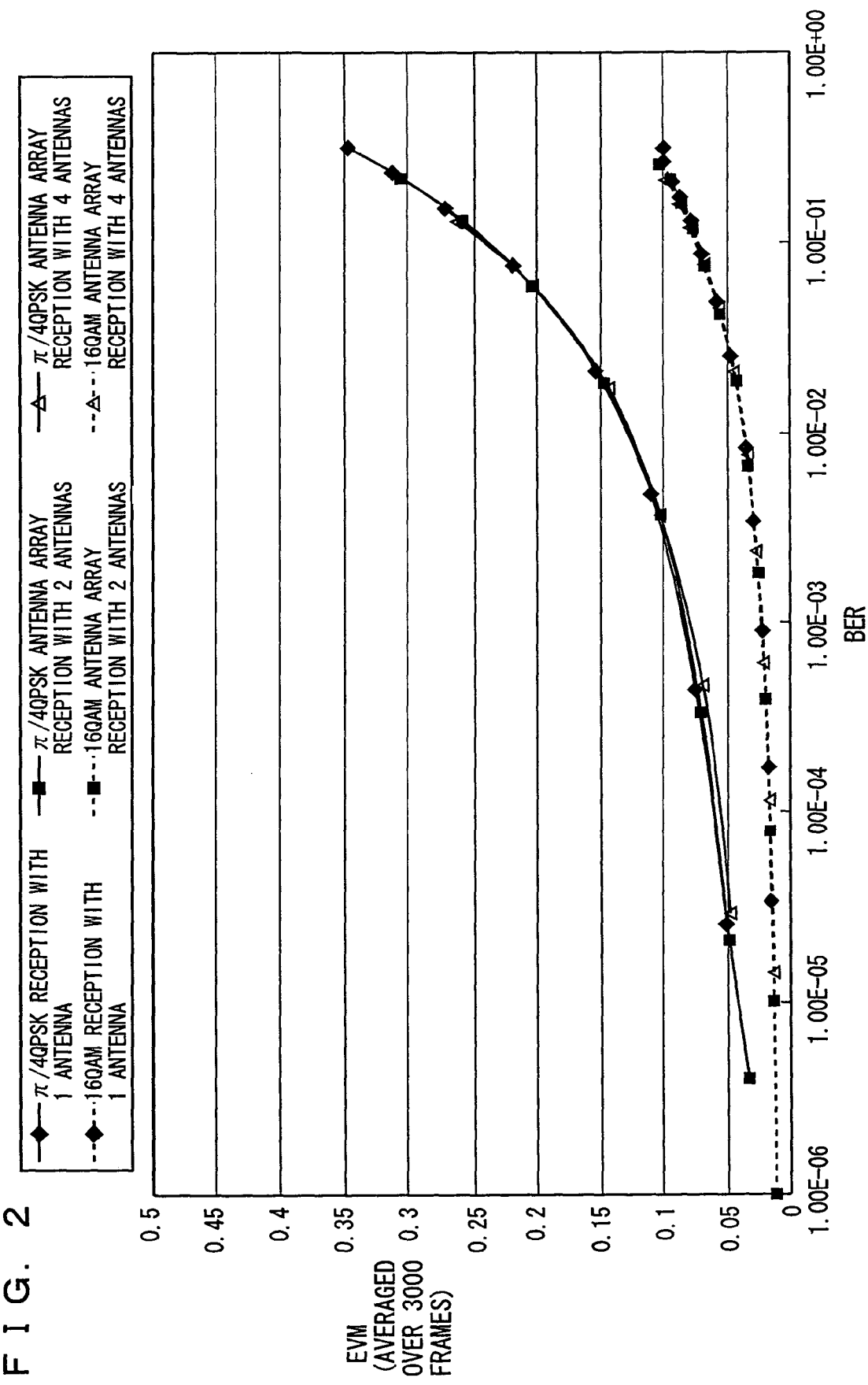
FIG. 2 shows simulation results representing relation between EVM and BER.

In the following, preferred embodiments of the present invention will be described in detail with reference to the figures. In the figures, the same or corresponding portions will be denoted by the same reference characters and description thereof will not be repeated.

FIG. 1 shows QPSK symbol points on an IQ coordinate plane, illustrating the principle of the present invention. Black circles on the coordinate represent original symbol points, and the X mark represents an actually received symbol point. As shown in FIG. 1, generally, the position of the actually received symbol point is shifted off (deviated)

from the point of true symbol (reference symbol) point (by the distance represented by the arrow in FIG. 1).

The magnitude of the shift-off (error) is considered to be a parameter that most exactly represents the communication (reception) quality of the propagation path, reflecting not only the conventional parameters such as reception level, reception error (FER) and interference level (CIR) but also all the elements of the reception apparatus such as the performance and quality of the apparatus.

The error between the true symbol point and the received symbol point (the distance represented by the arrow in FIG. 1) is referred to as an error vector, and of which magnitude is referred to as an error vector magnitude (EVM). In the following description, the magnitude of the error vector will be simply referred to as EVM.

It is noted that EVM itself has been known as disclosed, for example, in *Statistical Analysis of Noise Measure Accuracy* by Wayne Music of Broadcom Corp. (IEEE P802.15-01/090r2, Wireless Personal Area Networks, Mar. 8, 2001).

The present invention utilizes EVM as a parameter for evaluating communication quality of the propagation path in adaptive modulation. Specifically, communication quality of the propagation path is evaluated using EVM that is a global parameter representing the result of reception including all the elements related to propagation, reflecting not only the state of radio waves on the propagation path such as represented by the reception level, reception error (FER) and interference level (CIR) but also the performance of the reception apparatus. Thus, highly reliable switching among modulation methods becomes possible.

More specifically, it is confirmed in advance that when EVM measured in QPSK having small multi-value number is not larger than a certain value, no error is generated even if the modulation method is switched to 16QAM having larger multi-value number, and using the certain value as a threshold value, whether switching should be made or not is determined by comparing the actually measured EVM with the threshold value.

By way of example, when the measured EVM in QPSK is larger than the threshold value mentioned above, it is considered that communication quality is unsatisfactory, and hence modulation method is not switched to 16QAM, and when it is not larger than the threshold value, the method is switched to 16QAM. When the communication quality degrades thereafter, modulation method may be switched back to QPSK.

The method of calculating EVM between the true symbol point and the reception symbol point shown in FIG. 1 will be described. In FIG. 1, when we represent the coordinates of the true symbol point and the received symbol point on the IQ coordinate plane as (di, dq) and (yi, yq), respectively, EVM can be calculated in accordance with the following equation, as it corresponds to a distance between the two points.

$$EVM=(yi-di)^2+(yq-dq)^2$$

Details of EVM calculation are described in the document specified above, and therefore, further description will not be given here.

In general, EVM is defined as a magnitude of an error vector in many cases as described in the above specified document. In a communication apparatus actually implemented by circuits, however, it is difficult to perform the square root operation. Therefore, EVM is defined as the square of the magnitude of the error vector in the description of the preferred embodiment of the present application.

Even if EVM is defined as the square of the error vector, the object of the present invention can be achieved since the relation in magnitude between EVM and a threshold value which will be described later can be kept constant by treating such threshold value as a square value.

As described above, EVM is a parameter of communication quality reflecting even the difference in type of reception apparatuses, and it has been proved through simulation that generation of a reception error can be uniquely represented by EVM, regardless of the difference in type of reception apparatuses.

FIG. 2 is a graph representing a simulation result of the relation between EVM as such and error generation rate in the received signals. Specifically, the abscissa of FIG. 2 represents BER (Bit Error Rate), that is, rate of reception error generation in the received signals, while the ordinate represents EVM (averaged over 3000 frames).

Referring to FIG. 2, solid lines of the graph represent relation between BER and EVM in accordance with π/4QPSK as one type of QPSK modulation method, in normal reception using one antenna (plotted with black rhombuses), adaptive array reception using an array antenna with two antennas (plotted with black squares) and adaptive array reception using an array antenna with four antennas (plotted with white triangles), respectively.

As is apparent from the solid lines of the graph, when π/4QPSK modulation method is employed, the relation between EVM and BER is uniquely determined regardless of the difference in the number of antennas or the difference of reception method, that is, whether it is adaptive array or normal reception.

Further, dotted lines in the graph of FIG. 2 represent relation between BER and EVM in accordance with 16QAM modulation method, in normal reception using one antenna (plotted with black rhombuses), adaptive array reception using an array antenna with two antennas (plotted with black squares) and adaptive array reception using an array antenna with four antennas (plotted with white triangles), respectively.

As is apparent from the dotted lines of the graph, when 16QAM modulation method is employed, the relation between EVM and BER is again uniquely determined regardless of the difference in the number of antennas or the difference of reception method, that is, whether it is adaptive array or normal reception.

From the result that the relation between EVM and BER is again uniquely determined among different reception apparatuses, it is understood that EVM can be commonly used as a parameter for evaluating communication quality, regardless of the types of reception apparatuses, and that EVM is easy to use as a parameter for evaluating communication quality.

It is generally impossible to calculate BER simultaneously during communication. BER and EVM, however, correspond uniquely with each other as described above, and hence it is possible to estimate BER from EVM during communication. Therefore, EVM can be used as a parameter in place of BER.

Similarly, it has been proved from data obtained by actual apparatuses that there is a one-to-one relation between EVM and CIR, which is a parameter related to the interference level of the propagation path.

Figure 3:
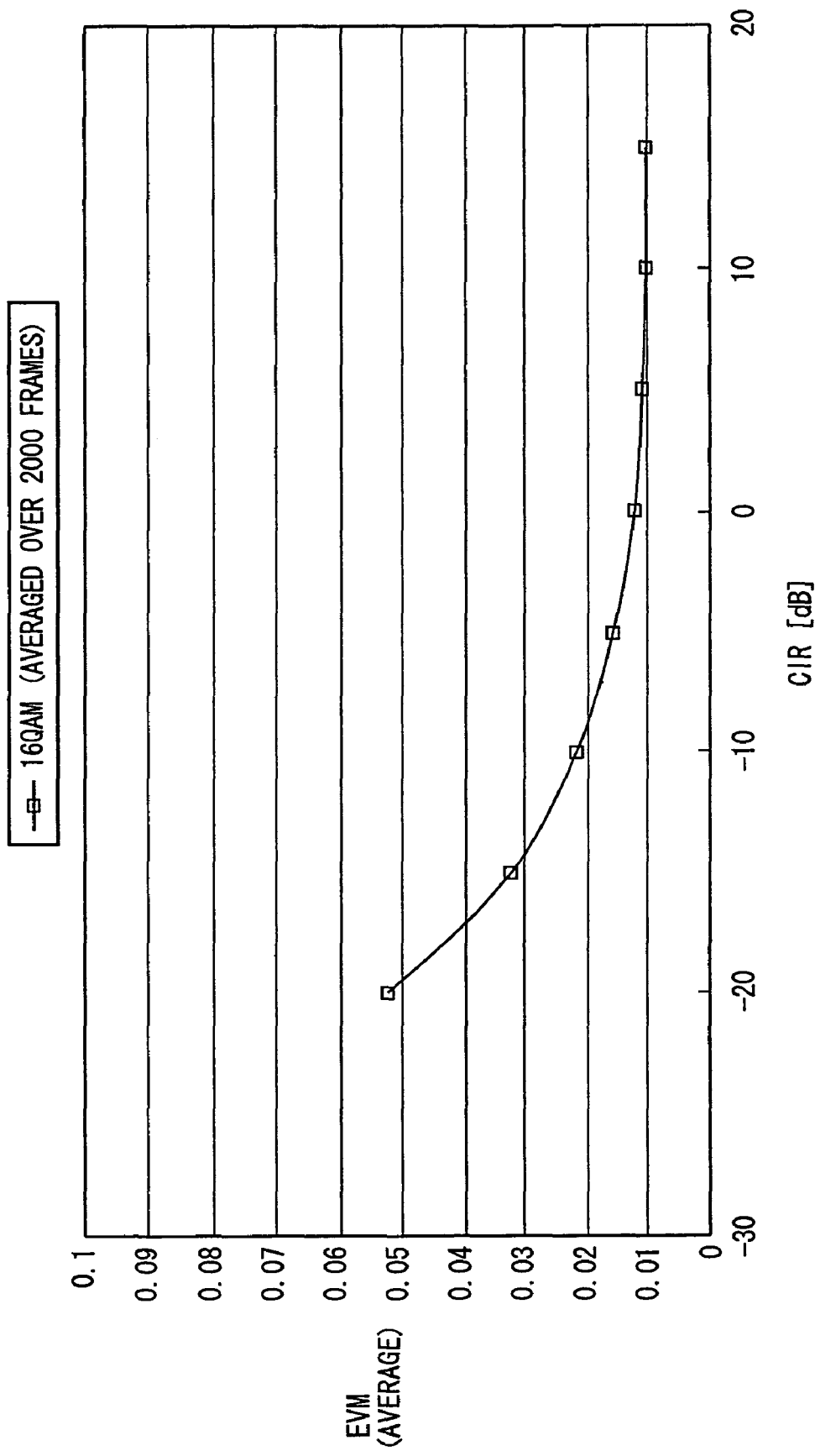
FIG. 3 shows data representing the relation between EVM and CIR obtained from actual apparatuses.

The graph of FIG. 3 represents the data obtained by actual apparatuses, representing such a relation between EVM and CIR. Specifically, the abscissa of FIG. 3 represents CIR that is a ratio between a desired signal (carrier level) and interference level, and the ordinate represents EVM (averaged over 2000 frames under 16QAM modulation method).

In FIG. 3, the solid line in the graph represents the relation between. CIR and EVM when 16QAM modulation method is employed.

As is apparent from the solid line of the graph, the relation between EVM and CIR is determined uniquely. As mentioned earlier, it has been very difficult to calculate the interference level (CIR) during communication.

In contrast, CIR and EVM correspond one-to-one with each other as shown in FIG. 3, and hence, it is possible to use EVM that can be calculated more easily as a parameter in place of CIR.

As described above, EVM has high correlation with all parameters that represent communication quality such as BER and CIR, has higher accuracy than conventional parameters as a reference for evaluating communication quality of the propagation path in adaptive modulation, and in addition, it can be calculated through a relatively easy process.

Figure 4:
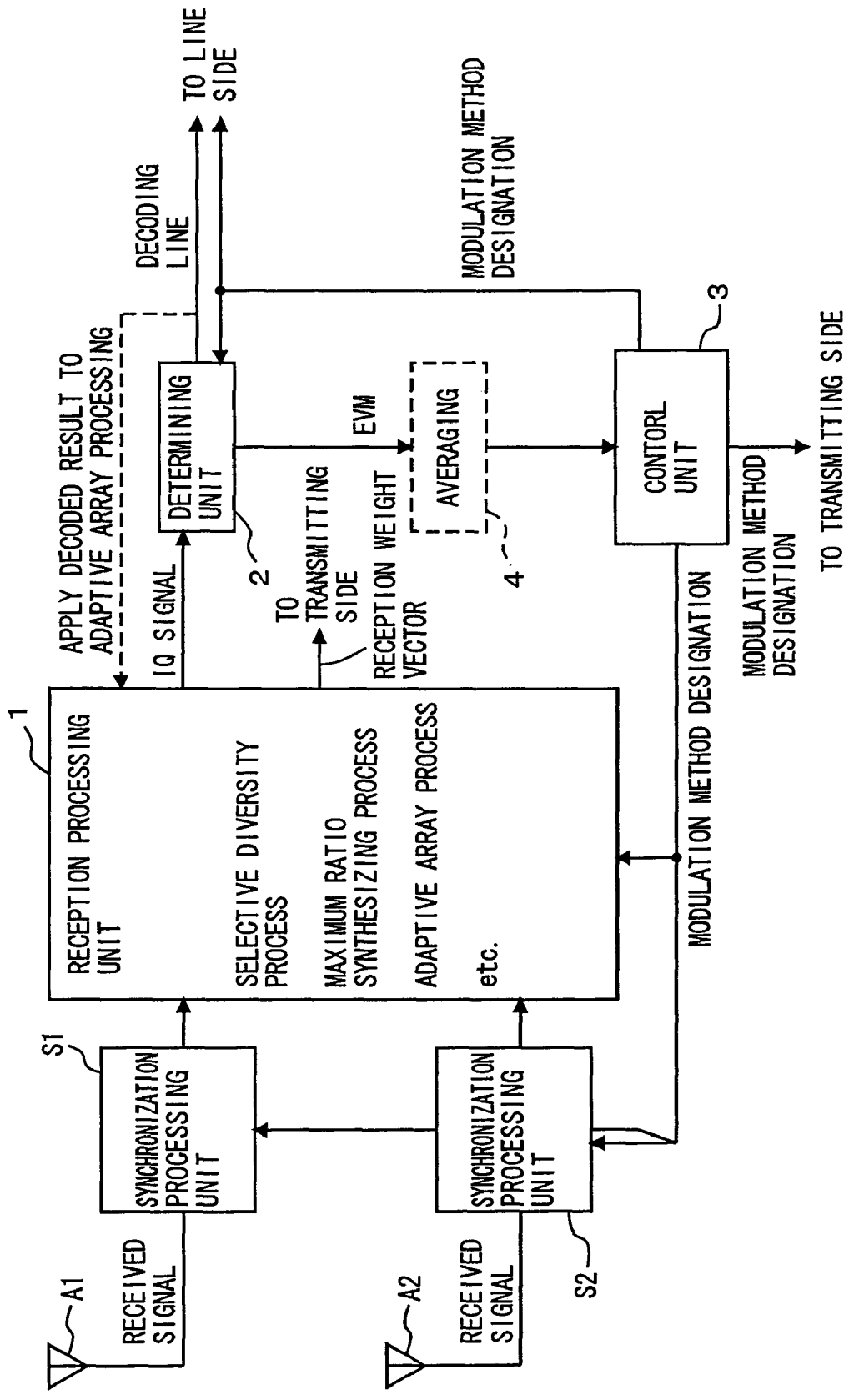
FIG. 4 is a functional block diagram representing a configuration of the radio reception apparatus in accordance with an embodiment of the present invention.

FIG. 4 is a functional block diagram representing a configuration of a radio reception apparatus capable of adaptive modulation in accordance with an embodiment of the present invention. In the present embodiment, it is assumed that the radio reception apparatus is compatible between QPSK as a modulation method of smaller multi-value number and 16QAM as a modulation method of larger multi-value number.

The present invention is also applicable to a terminal as well as to a base station that constitute mobile communication system such as PHS. Further, the present invention is applicable no matter whether there is one antenna or two or more antennas. As to the method of reception processing, the present invention is applicable to any method of signal processing, including selective diversity method, maximum ratio synthesizing process and adaptive array processing.

In the example shown in FIG. 4, a radio reception apparatus will be described, which receives signals from the transmitting side using a plurality of (two) antennas.

Referring to FIG. 4, signals received by antennas A1 and A2 are applied to synchronization processing units S1 and S2, respectively, and subjected to synchronizing process in accordance with the modulation method (QPSK or 16QAM) designated by a control unit 3.

The received signals of two streams that have been subjected to prescribed synchronizing process by synchronization processing units S1 and S2 are applied to a reception processing unit 1. Reception processing unit 1 may perform reception process in accordance with arbitrary method such as selective diversity process, maximum ratio synthesizing process or adaptive array process. In this example, reception process is performed in accordance with the adaptive array process, as will be described later.

Figure 5:
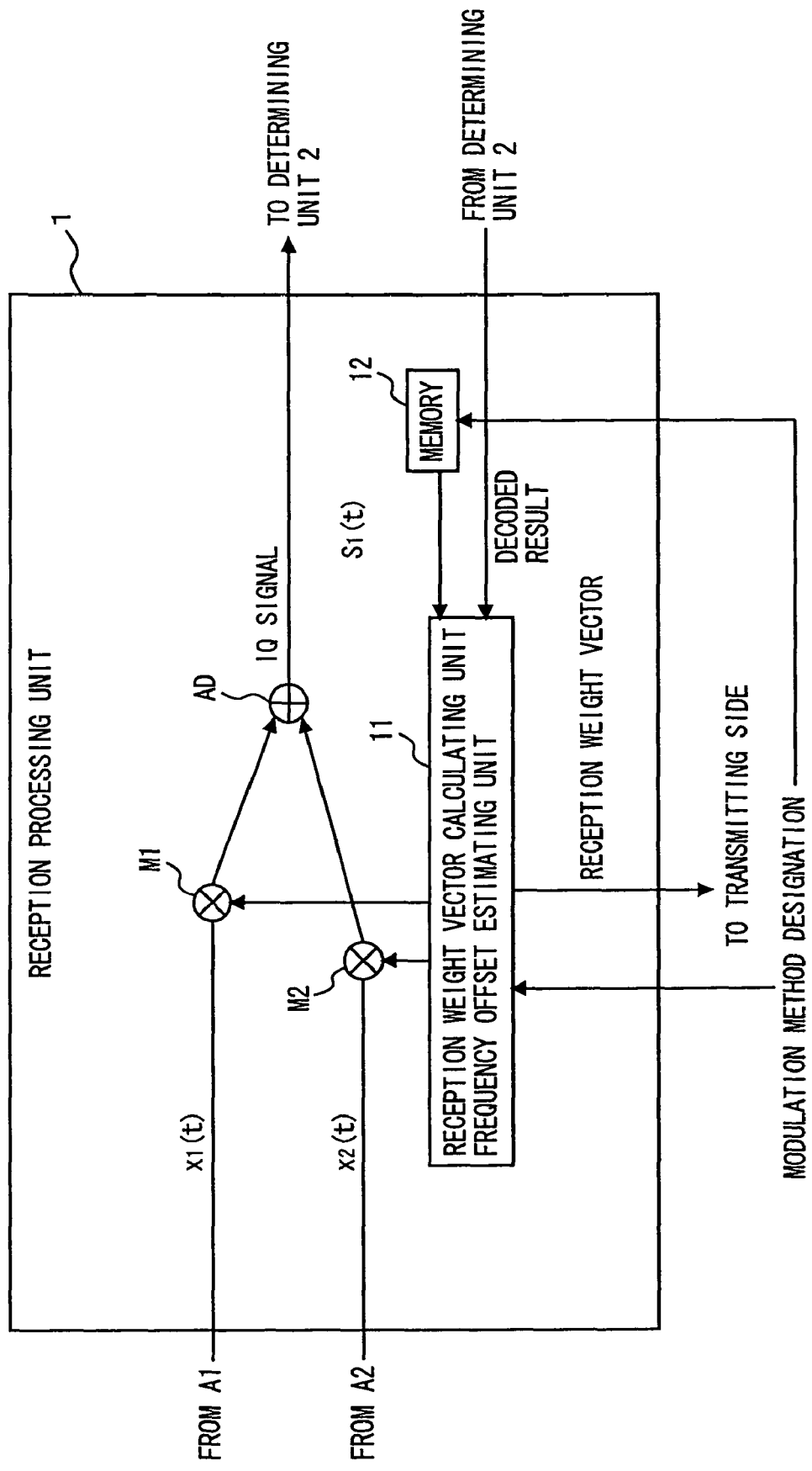
FIG. 5 is a functional block diagram representing a configuration of a reception processing unit 1 when an adaptive array processing is performed.

FIG. 5 is a functional block diagram representing a configuration of reception processing unit 1 that performs the adaptive array reception processing. In reception processing unit 1 shown in FIG. 5, the input, received signals of two streams are synthesized by adaptive array processing, and the result of synthesization is subjected to a decoding process by a determining unit 2 (FIG. 4) of a succeeding stage.

Here, adaptive array processing refers to a known process in which based on a signal received from a transmitting side radio apparatus, a weight vector consisting of reception factors (weights) of a plurality of (two in the present embodiment) antennas of the reception apparatus is estimated and adaptive control is realized, so as to correctly extract (synthesize) the signal received from a specific radio apparatus of the transmitting side.

In reception processing unit 1 shown in FIG. 5, a reception weight vector calculating unit·frequency offset estimating unit 11 is provided for estimating such weight vector for every symbol of the received signals. Reception weight vector calculating unit·frequency offset estimating unit 11 performs a process in which the weight vector is converged to reduce square of error between the received signal decoded by determining unit 2 of a succeeding stage and a known reference signal in a memory 12, in accordance with a method that corresponds to the modulation method (QPSK or 16QAM) designated by control unit 3 (FIG. 4), that is, the estimating unit performs an adaptive array process in which reception directivity from a specific radio apparatus on the transmitting side is converged.

In the adaptive array process, such convergence of the weight vector is performed in an adaptive manner in accordance with time or fluctuation of propagation path characteristics of signal radio waves, to remove interfering component or noise from the received signal and to extract signals received from a specific radio apparatus on the transmitting side.

In the weight vector calculating unit as such, sequential estimation algorithm such as RLS (Recursive Least Squares) algorithm, or LMS (Least Mean Square) algorithm is used as the weight estimation algorithm.

Such RLS algorithm and LMS algorithm are well-known in the field of adaptive array processing, and described in detail, for example, in *Adaptive Signal Processing by Array Antenna* (array antenna ni yoru tekio shingo shori), by Nobuyoshi Kikuma (Kagaku Gijutsu Shuppan, Nov. 25, 1998), "*Chapter* 3: *MMSE Adaptive Array*" on pp. 35-49. Therefore, detailed description of the adaptive array will not be given here.

The reception weight vector calculated in this manner by the reception weight vector calculating unit·frequency offset estimating unit 11 is subjected to complex multiplication with received signals x1(t) and x2(t) from antennas A1 and A2, the results are added by an adder AD, and the result is output as an IQ signal from reception processing unit 1 and supplied to a determining unit 2 (FIG. 4) in the succeeding stage.

The calculated reception weight vector is transferred to a transmitting side processing unit (not shown) of this radio apparatus, to be used as a transmission weight vector.

Returning to FIG. 4, determining unit 2 decodes the IQ signal output from reception processing unit 1 by a modulation method (QPSK or 16QAM) designated by control unit 3, supplies the same to the line side and to reception processing unit 1 for adaptive array processing.

Determining unit 2 calculates EVM between a received symbol point of the IQ signal supplied from reception processing unit 1 and the true symbol point and, supplies the calculated value to control unit 3, possibly through an averaging unit 4 if appropriate.

Control unit 3 compares the calculated EVM with a threshold value that have been calculated and held in advance, and according to the result, generates a control signal designating a modulation method to be applied to the line side, determining unit 2, reception processing unit 1, synchronization processing units S1 and S2 and to the radio apparatus on the transmitting side. The operation of designating the modulation method by control unit 3 will be described later.

In the example shown in FIG. 5, at reception processing unit 1, interfering signal components are removed by the adaptive array processing, and thereafter, desired signals are decoded. Therefore, EVM can be calculated in consideration of the interference removing capability by the adaptive array.

Prior to the description of the operation by control unit 3, averaging process by the averaging unit 4 will be described. There are two possible types of averaging as the averaging process of EVM, that is, averaging within a frame and averaging over frames of the received signals.

As is apparent from the description above, EVM is calculated symbol by symbol of the received signals. Therefore, it is possible to average the EVM over a prescribed period (prescribed number of symbols) within a frame. Particularly, when adaptive array processing such as described with reference to FIG. 5 is to be performed, it may be possible to start averaging after the weight of array reception is sufficiently converged. By such averaging, it becomes possible to improve reliability of EVM as a parameter, as the influence of external disturbance such as noise can be reduced.

Further, it is possible to perform inter-frame averaging, using the method of moving averages as will be described below. Specifically, the average EVM value of the (n+1)th frame is given by the following equation, where n represents a frame number, Ave_EVM(n) represents an average EVM of the nth frame, EVM (n) represents instantaneous value of EVM of the nth frame, and $\lambda (0 \leq \lambda \leq 1)$ represents forgetting factor.

$$Ave\_EVM(n+1) = \lambda * Ave\_EVM(n) + (1-\lambda) * EVM(n)$$

Here, the forgetting factor $\lambda$ is a weight for the average value AvE_EVM(n), and $(1-\lambda)$ is a weight for the instantaneous value EVM (n). The larger the value $\lambda$, the longer the time necessary for averaging, and the smaller the influence of external disturbance. Such moving average is effective where memory capacity for averaging process is insufficient.

The adaptive modulation operation of the radio reception apparatus shown in FIG. 4 will be described. It is noted that the configuration shown in the functional block diagram of FIG. 4 is actually implemented by software, by a digital signal processor (DSP), not shown.

Figure 6:
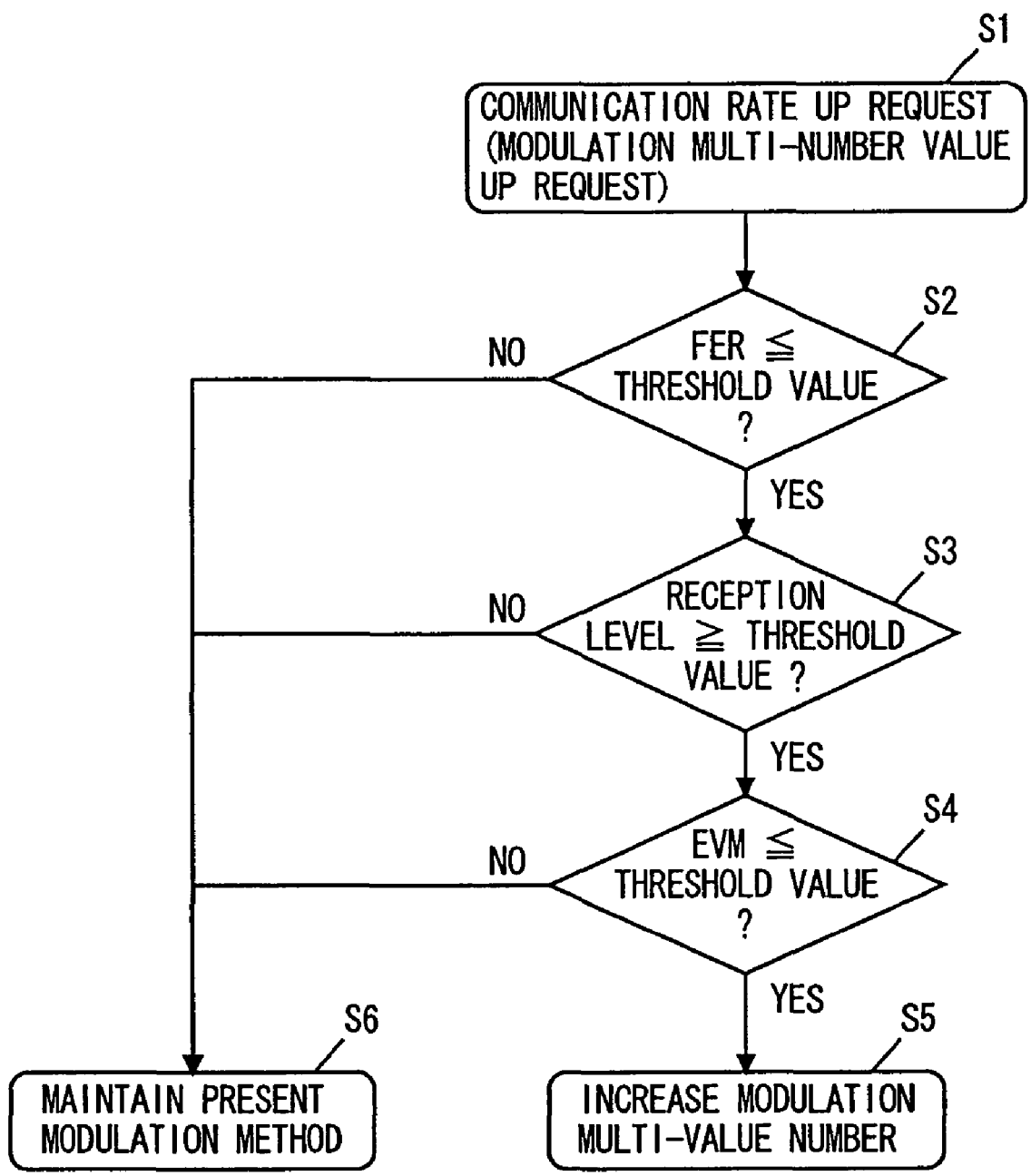
FIG. 6 is a flow chart representing an operation of increasing the multi-value number of the modulation method.
Figure 7:
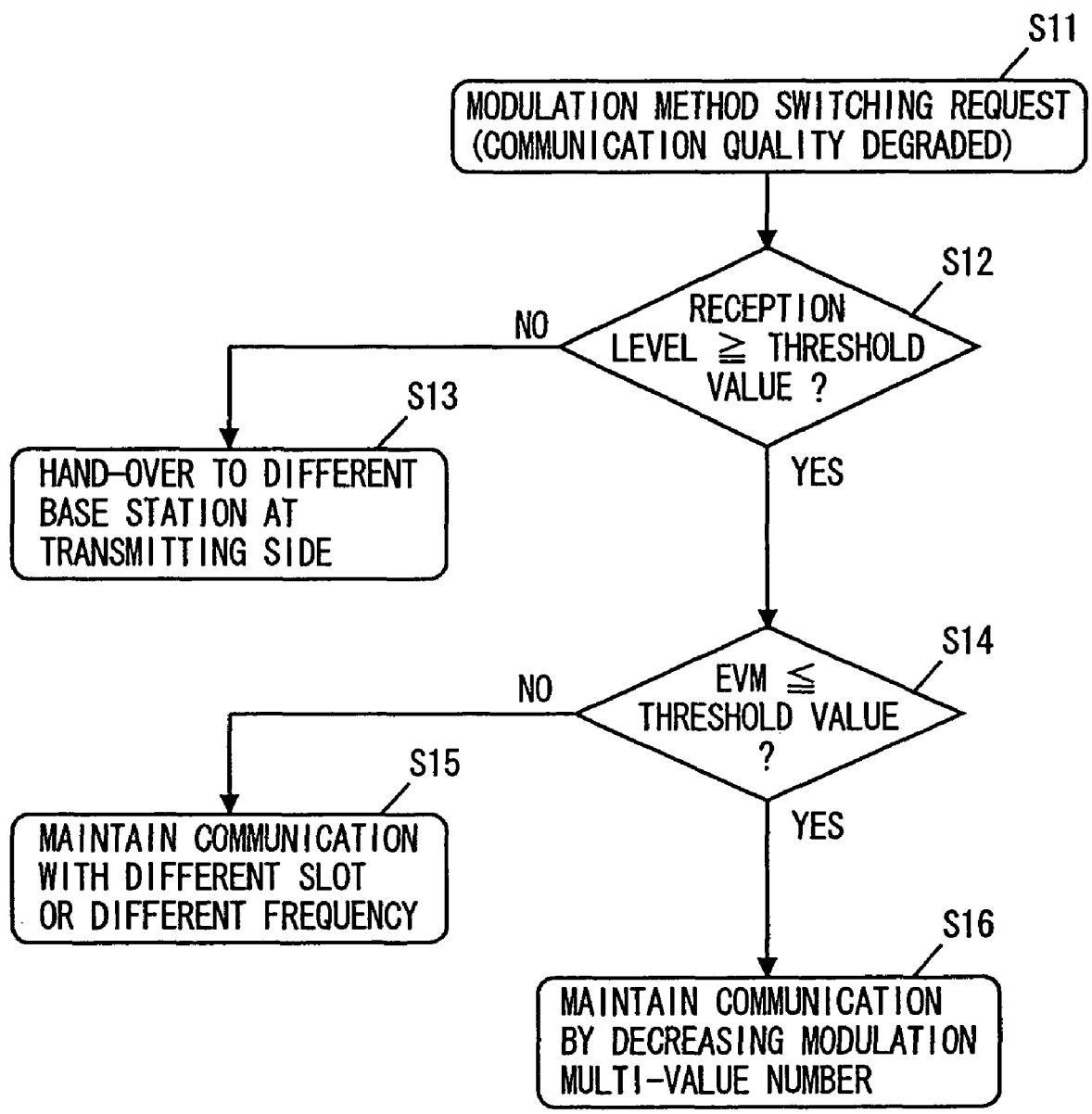
FIG. 7 is a flow chart representing an operation of decreasing the multi-value number of the modulation method.

In adaptive modulation, a request for increasing or decreasing the multi-value number (communication rate) of modulation method from the modulation method that has been used at that time point is output by a user or the control unit. FIG. 6 is a flow chart representing an operation of increasing the multi-value number of the modulation method, and FIG. 7 is a flow chart representing an operation of decreasing the multi-value number of the modulation method.

First, referring to FIG. 6, the operation of increasing the multi-value number of the modulation method will be described. In the conventional adaptive modulation method, determination as to whether the multi-value number is to be increased has been made using parameters such as reception error (FER) and reception level, as described above. These parameters, however, are not very reliable, and the multi-value number cannot always be increased even when both parameters satisfy required conditions.

Though CIR reflecting the interference level has been known as an exact parameter, calculation thereof requires a complicated process. In the present embodiment, it is possible to make more accurate determination of switching, by using not CIR but EVM as a parameter.

In step S1, when a request (UP request) for increasing the communication rate (modulation multi-value number) is issued from control unit 3 during communication in a modulation method having small multi-value number (QPSK), it is determined in step S2 whether FER is not higher than a prescribed threshold value or not. If it is higher than the threshold value, it is determined that the communication quality of the propagation path is unsatisfactory, and the flow proceeds to step S6, to maintain the present method of modulation (QPSK), not increasing the modulation multi-value number.

In step S2, when it is determined that FER is not higher than the threshold value, the flow proceeds to step S3, and it is determined whether the reception level is not lower than a threshold value or not. If it is lower than the threshold value, it is determined that the communication quality of the propagation path is unsatisfactory, and the flow proceeds to step S6, to maintain the present method of modulation (QPSK), not increasing the modulation multi-value number.

When it is determined in step S3 that the reception level is not lower than the threshold value, the flow proceeds to step S4, and whether EVM is not higher than a threshold value or not is determined. If it is higher than the threshold value, the flow proceeds to step S6 even when it has been determined through steps S2 and S3 that the communication quality in view of FER and reception level is relatively satisfactory, and the present modulation method (QPSK) is maintained without increasing the modulation multi-value number.

If it is determined in step S4 that EVM is not higher than the threshold value, the flow proceeds to step S5, and the modulation method is switched from QPSK to 16QAM to have larger multi-value number.

It is noted that the determination of FER in step S2 and the determination of reception level in step S3 are of supplementary nature, and only the EVM determination may be made while omitting steps S2 and S3.

Next, referring to FIG. 7, the operation of decreasing the multi-value number of the modulation method will be described. Assume that in step S11, during communication in a modulation method having large multi-value number (16QAM), a reception error is detected by control unit 3, leading to a determination that the communication quality has been degraded.

Conventionally, in a mobile communication system such as PHS, upon determination that communication quality has been degraded, a communication channel between the radio apparatus on the transmitting side (in this example, terminal of the mobile communication system) and the reception apparatus of interest (in this example, base station) is switched, or a hand-over process is executed to connect the terminal to a different base station. It is noted that the radio apparatus capable of adaptive modulation realizes another option to decrease the multi-value number to cope with the situation.

First, in step S12, whether the reception level is not lower than a threshold value or not is determined. If it is lower than the threshold value, it is presumed that the terminal has moved far away from the reception apparatus of interest, and the flow proceeds to step S13 to execute the hand-over process, as it is determined that communication can be maintained only by connecting to a different base station.

If it is determined in step S12 that the reception level is not lower than the threshold value, it is determined in step S14 whether EVM is not higher than a threshold value or not.

If it is determined in step S14 that EVM is higher than the threshold value, it is determined that though the terminal is close to the base station, state of the propagation path is unsatisfactory, and that communication would not be maintained by the channel being used. Thus, the flow proceeds to step S15 and communication channel is switched to a different one (of a different time slot, different frequency or the like).

If it is determined in step S14 that EVM is not higher than the threshold value, it is determined that the state of the propagation path is fairly well, and the flow proceeds to step S16 to maintain communication with the multi-value number of the modulation method decreased.

It is noted that determination of reception level in step S12 is of supplementary nature, and only the determination of EVM in step S14 may be made while omitting step S12.

Negotiation procedure between the transmitting side and the receiving side at the time of adaptive modulation will be described in the following. The procedure is basically common to the normal adaptive modulation. In the example below, however, EVM is notified as a parameter for switching multi-value number, as a characteristic particular to the present invention.

Figure 8:
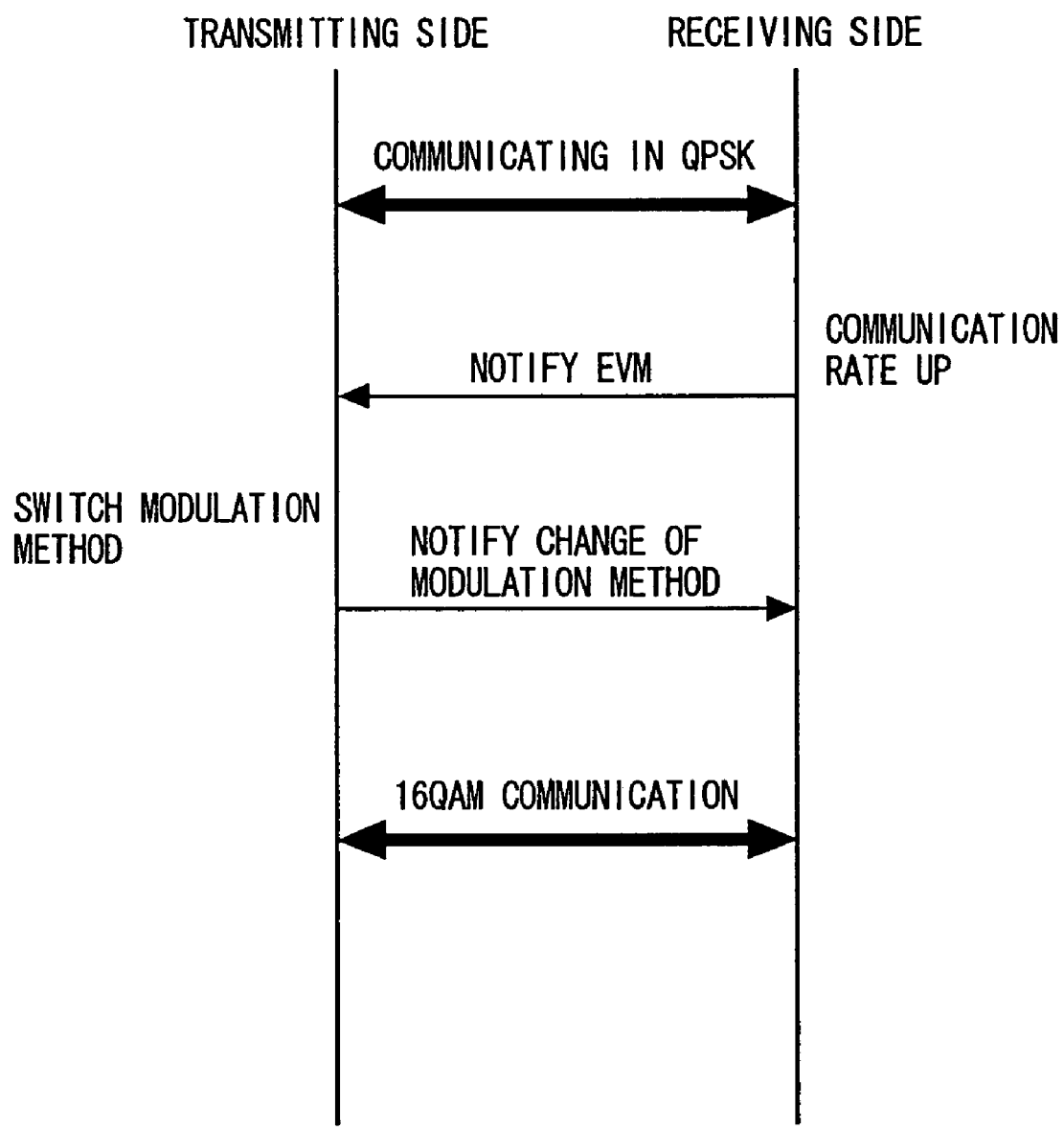
FIG. 8 shows negotiation procedure between a transmitting side and a receiving side when multi-value number of the modulation method is to be increased.

FIG. 8 illustrates the procedure of negotiation between the transmitting side and the receiving side when the multi-value number of modulation method is to be increased.

Referring to FIG. 8, first, assume that communication has been made in QPSK. If there is a request to increase the communication rate from the control unit or the user on the receiving side, EVM is measured by the receiving side in the manner as described above (in accordance with the flow of FIG. 6), and if it is determined that switching to 16QAM is possible, EVM is notified to the transmitting side.

If it is determined on the transmitting side also that the conditions for switching the modulation method are satisfied, a modulation method changing notice is issued from the transmitting side, and both the transmitting side and the receiving side switch to 16 QAM communication.

Figure 9:
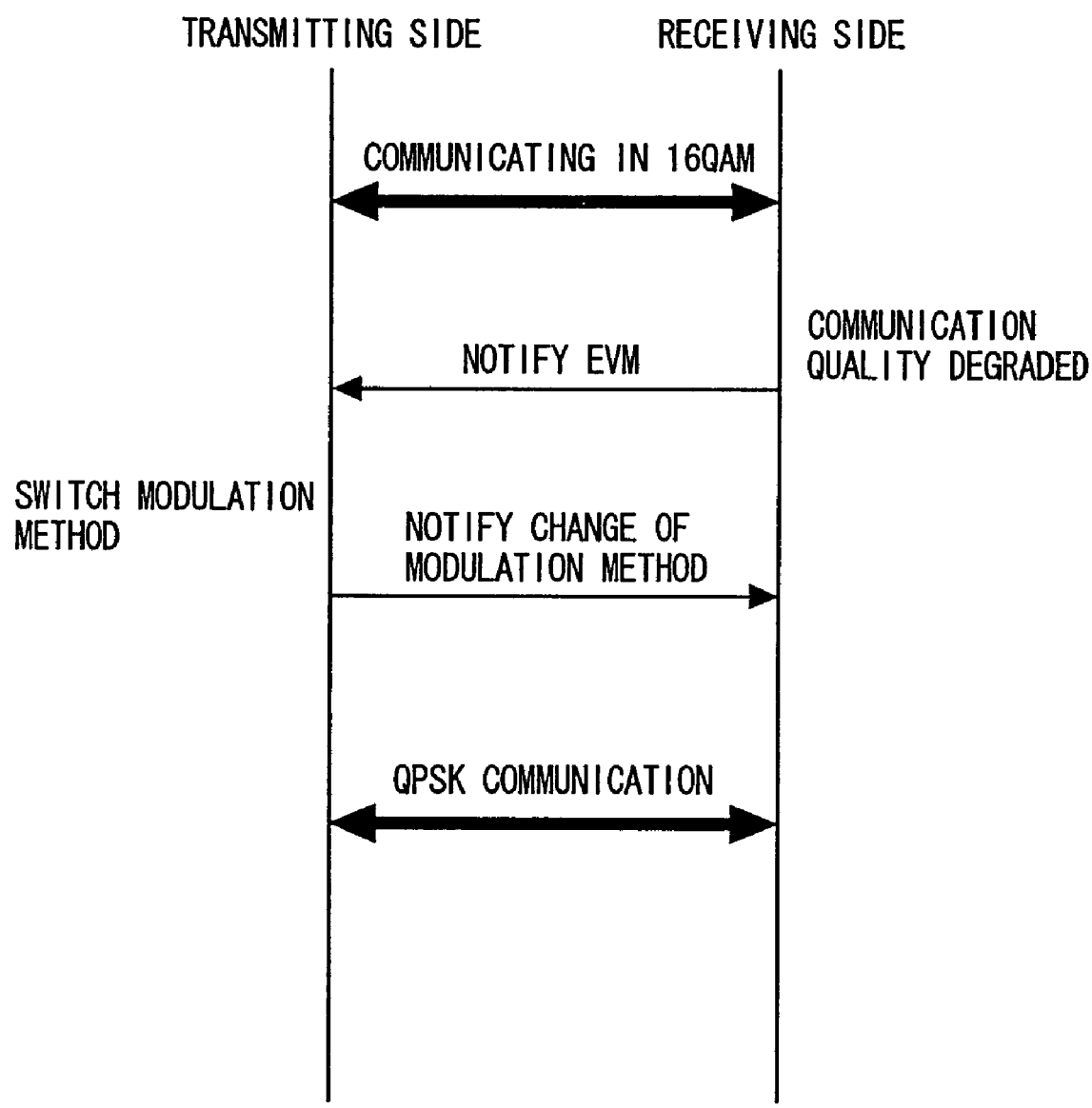
FIG. 9 shows negotiation procedure between a transmitting side and a receiving side when multi-value number of the modulation method is to be decreased.
Figure 10B:
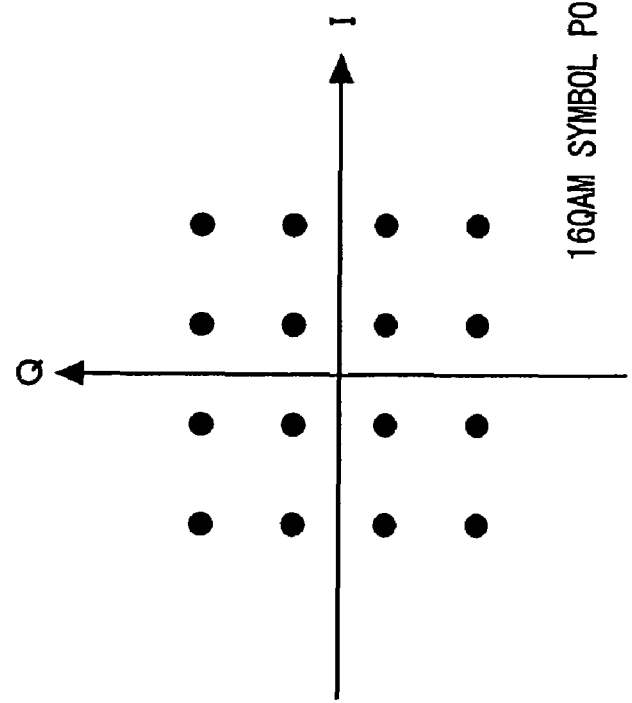
FIGS. 10A and 10B represent arrangements of symbol points of QPSK and 16QAM on an IQ coordinate plane.
Figure 10A:
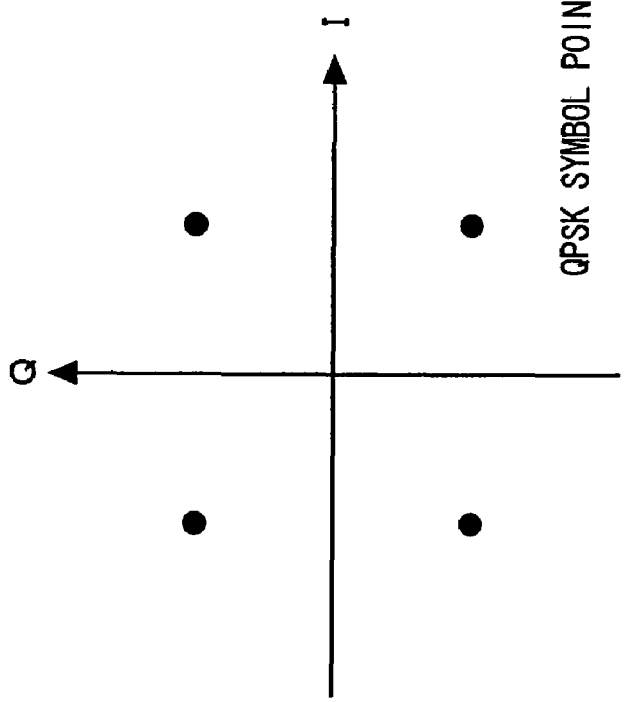

FIG. 9 illustrates negotiation procedure between the transmitting side and the receiving side when the multi-value number of modulation method is to be decreased.

Referring to FIG. 9, first, it is assumed that communication has been made in 16QAM. Here, if degradation of reception quality is detected by the control unit on the receiving side, EVM is measured by the receiving side in the manner as described above (in accordance with the flow of FIG. 7), and if it is determined that switching to QPSK is possible, EVM is notified to the transmitting side.

If it is determined on the transmitting side also that the conditions for switching the modulation method are satisfied, a modulation method changing notice is issued from the transmitting side, and both the transmitting side and the receiving side switch to QPSK communication.

As described above, in the embodiment of the present invention, as reference for switching multi-value number at the time of adaptive modulation, EVM that reflects all the elements related to communication quality and that can be measured relatively easily is used, enabling more appropriate switching of modulation method.

Though QPSK and 16QAM have been described as examples of modulation methods having small multi-value number and large multi-value number, respectively, the present invention is not limited to these modulation methods, and the present invention is applicable to a plurality of modulation methods having different multi-value numbers.

As described above, according to the present invention, in a radio reception apparatus compatible to adaptive modulation method, EVM that reflects all the elements related to communication quality is used as a parameter for evaluating communication quality of the propagation path, and hence, highly accurate switching among different modulation methods in accordance with the communication quality of the propagation path becomes possible.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A radio reception apparatus compatible with a plurality of modulation methods having different multi-value numbers, comprising:
    a measuring unit measuring an error vector corresponding to a distance between an original symbol point of a received signal and an actually received symbol point on an IQ coordinate plane;
    a comparing unit comparing said measured error vector with a prescribed threshold value; and
    a modulation method switching unit switching the modulation method in accordance with result of comparison by said comparing unit.

2. The radio reception apparatus according to claim 1, wherein
    when a switching request is made during a communication in a first modulation method having a small multi-value number for switching to a second modulation method having a larger multi-value number and it is determined by said comparing unit that said measured error vector is not larger than a prescribed first threshold value, said modulation method switching unit switches the modulation method from said first modulation method to said second modulation method, and when it is determined that said error vector is larger than said first threshold value, maintains said first modulation method.

3. The radio reception apparatus according to claim 2, wherein
    said measuring unit detects other parameter for evaluating communication quality of a propagation path in addition to said error vector; and
    said modulation method switching unit maintains said first modulation method when it is determined that said measured error vector is larger than said first threshold value, even when said detected parameter represents a relatively satisfactory communication quality.

4. The radio reception apparatus according to claim 1, wherein
    when a request for interrupting communication through a propagation path because of degradation of communication quality is made during a communication in a second modulation method having a large multi-value number and it is determined by said comparing unit that said measured error vector is not larger than a prescribed second threshold value, the modulation method switching unit switches the modulation method from said second modulation method to a first modulation method having smaller multi-value number to maintain communication, and when it is determined that said error vector is larger than said second threshold value, interrupts communication through said propagation path.

5. The radio reception apparatus according to claim 4, wherein
    said measuring unit detects other parameter for evaluating communication quality of a propagation path in addition to said error vector; and said modulation method switching unit interrupts communication through the propagation path when it is determined that said measured error vector is larger than said second threshold value, even when said detected parameter represents a relatively satisfactory communication quality.

6. The radio reception apparatus according to claim 1, further comprising
a reception processing unit performing a reception process of selecting or synthesizing said received signal; wherein
said measuring unit measures said error vector of the received signal that has been subjected to said reception process.

7. The radio reception apparatus according to claim 1, further comprising
an intra-frame averaging unit for averaging error vectors measured by said measuring unit over a prescribed number of symbols in a frame.

8. The radio reception apparatus according to claim 1, further comprising
an inter-frame averaging unit for averaging error vectors measured by said measuring unit over frames.

9. The radio reception apparatus according to claim 1, wherein
said modulation method switching unit notifies switching of the modulation method to a radio apparatus of a partner of communication.

10. A radio reception method in a radio reception apparatus compatible with a plurality of modulation methods having different multi-value numbers, comprising the steps of:
measuring an error vector corresponding to a distance between an original symbol point of a received signal and an actually received symbol point on an IQ coordinate plane;
comparing said measured error vector with a prescribed threshold value; and
switching the modulation method in accordance with result of comparison by said comparing step.

11. The radio reception method according to claim 10, wherein
in said step of switching the modulation method, when a switching request is made during a communication in a first modulation method having a small multi-value number for switching to a second modulation method having a larger multi-value number and it is determined by said comparing step that said measured error vector is not larger than a prescribed first threshold value, the modulation method is switched from said first modulation method to said second modulation method, and when it is determined that said error vector is larger than said first threshold value, said first modulation method is maintained.

12. The radio reception method according to claim 11, wherein
in said measuring step, other parameter for evaluating communication quality of a propagation path is detected in addition to said error vector; and
in said modulation method switching step, said first modulation method is maintained when it is determined that said measured error vector is larger than said first threshold value, even when said detected parameter represents a relatively satisfactory communication quality.

13. The radio reception method according to claim 10, wherein
in said step of switching the modulation method, when a request for interrupting communication through a propagation path because of degradation of communication quality is made during a communication in a second modulation method having a large multi-value number and it is determined by said comparing step that said measured error vector is not larger than a prescribed second threshold value, the modulation method is switched from said second modulation method to a first modulation method having smaller multi-value number to maintain communication, and when it is determined that said error vector is larger than said second threshold value, communication through said propagation path is interrupted.

14. The radio reception method according to claim 13, wherein
in said measuring step, other parameter for evaluating communication quality of a propagation path is detected in addition to said error vector; and
in said modulation method switching step, communication through the propagation path is interrupted when it is determined that said measured error vector is larger than said second threshold value, even when said detected parameter represents a relatively satisfactory communication quality.

15. The radio reception method according to claim 10, further comprising the step of
performing a process of selecting or synthesizing said received signal; wherein
in said measuring step, said error vector of the received signal that has been subjected to said process of selecting or synthesizing said received signal is measured.

16. The radio reception method according to claim 10, further comprising the step of
averaging error vectors measured in said step of measuring over a prescribed number of symbols in a frame.

17. The radio reception method according to claim 10, further comprising the step of
averaging error vectors measured in said step of measuring over frames.

18. The radio reception method according to claim 10, wherein
in said step of switching the modulation method, switching of the modulation method is notified to a radio apparatus of a partner of communication.

19. A radio reception program on a computer readable medium in a radio reception apparatus compatible with a plurality of modulation methods having different multi-value numbers, the program causing a computer to execute the steps of:
measuring an error vector corresponding to a distance between an original symbol point of a received signal and an actually received symbol point on an IQ coordinate plane;
comparing said measured error vector with a prescribed threshold value; and
switching the modulation method in accordance with result of comparison by said comparing step.

20. The radio reception program according to claim 19, wherein
in said step of switching the modulation method, when a switching request is made during a communication in a first modulation method having a small multi-value number for switching to a second modulation method having a larger multi-value number and it is determined by said comparing step that said measured error vector is not larger than a prescribed first threshold value, the modulation method is switched from said first modulation method to said second modulation method, and when it is determined that said error vector is larger than said first threshold value, said first modulation method is maintained.

21. The radio reception program according to claim 20, wherein in said measuring step, other parameter for evaluating communication quality of a propagation path is detected in addition to said error vector; and in said modulation method switching step, said first modulation method is maintained when it is determined that said measured error vector is larger than said first threshold value, even when said detected parameter represents a relatively satisfactory communication quality.

22. The radio reception program according to claim 19, wherein in said step of switching the modulation method, when a request for interrupting communication through a propagation path because of degradation of communication quality is made during a communication in a second modulation method having a large multi-value number and it is determined by said comparing step that said measured error vector is not larger than a prescribed second threshold value, the modulation method is switched from said second modulation method to a first modulation method having smaller multi-value number to maintain communication, and when it is determined that said error vector is larger than said second threshold value, communication through said propagation path is interrupted.

23. The radio reception program according to claim 22, wherein in said measuring step, other parameter for evaluating communication quality of a propagation path is detected in addition to said error vector; and in said modulation method switching step, communication through the propagation path is interrupted when it is determined that said measured error vector is larger than said second threshold value, even when said detected parameter represents a relatively satisfactory communication quality.

24. The radio reception program according to claim 19, to have a computer further execute the step of performing a process of selecting or synthesizing said received signal; wherein in said measuring step, said error vector of the received signal that has been subjected to said process of selecting or synthesizing said received signal is measured.

25. The radio reception program according to claim 19, to have a computer further execute the step of averaging error vectors measured in said step of measuring over a prescribed number of symbols in a frame.

26. The radio reception program according to claim 19, to have a computer further execute the step of averaging error vectors measured in said step of measuring over frames.

27. The radio reception program according to claim 19, wherein in said step of switching the modulation method, switching of the modulation method is notified to a radio apparatus of a partner of communication.

* * * * *